United States Patent
Arimilli et al.

(10) Patent No.: US 6,195,729 B1
(45) Date of Patent: Feb. 27, 2001

(54) DEALLOCATION WITH CACHE UPDATE PROTOCOL (L2 EVICTIONS)

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,317

(22) Filed: Feb. 17, 1998

(51) Int. Cl.$^7$ .................................................. G06F 12/08
(52) U.S. Cl. ........................... 711/119; 711/122; 711/165
(58) Field of Search .................................. 711/119, 117, 711/122, 146, 141, 124, 165

(56) References Cited

U.S. PATENT DOCUMENTS

| | | | |
|---|---|---|---|
| 5,537,575 | * | 7/1996 | Foley et al. ........................ 395/468 |
| 5,586,298 | * | 12/1996 | Shah ................................. 395/473 |
| 5,588,131 | * | 12/1996 | Borrill ............................... 395/473 |
| 5,822,767 | * | 10/1998 | MacWilliams et al. ............. 711/146 |
| 5,832,250 | * | 11/1998 | Whittaker ........................... 395/471 |
| 5,860,117 | * | 1/1999 | Cherabuddi ......................... 711/151 |
| 5,875,201 | * | 2/1999 | Bauman et al. ..................... 371/49.1 |
| 5,900,011 | * | 5/1999 | Saulsbury et al. .................. 711/119 |
| 5,918,069 | * | 6/1999 | Matoba .............................. 395/841 |

* cited by examiner

*Primary Examiner*—John W. Cabeca
*Assistant Examiner*—Fred F. Tzeng
(74) *Attorney, Agent, or Firm*—Volel Emile; Felsman, Bradley, Vaden, Gunter & Dillon, LLP

(57) ABSTRACT

In evicting data from a first cache in a level other than the lowest in a multilevel cache hierarchy, data is written to the system bus and snooped back into a second cache on a lower level in the cache hierarchy. The need for a private data path between the two caches is thus eliminated, and the second cache memory need not be dual-ported. The reload path employed for updating the second cache is reused to snoop cast-outs off the system bus. As a result of the first cache evicting data via the system bus, the second cache never contains data which is modified (M) with respect to system memory and other devices in a multiprocessor system get updated earlier. The need for error correction code (ECC) checking is eliminated, together with the associated additional bits, and may be replaced by simple parity checking. The bus into the second cache thus requires fewer bits, consumes less area, and may be operated at a higher frequency. When employed in conjunction with an H-MESI cache coherency protocol, horizontal devices go from the hovering (H) state to the shared (S) state faster.

14 Claims, 3 Drawing Sheets

DEALLOCATION WITH CACHE UPDATE PROTOCOL (L2 EVICTIONS)

RELATED APPLICATIONS

The present invention is related to the subject matter of commonly assigned, copending U.S. patent application Ser. No. 09/024,316 entitled "Merged Vertical Cache Controller Mechanism" and filed Feb. 17, 1998, the content of which is incorporated herein by reference.

BACKGROUND OF THE INVENTION

1. Technical Field

The present invention relates in general to eviction of data from caches in a data processing system and in particular to eviction of data from a cache in a data processing system having a multilevel cache hierarchy. Still more particularly, the present invention relates to eviction of data from one cache to a logically in line cache within a data processing system having a multilevel cache hierarchy.

2. Description of the Related Art

Most contemporary data processing system architectures include multiple levels of cache memory within the storage hierarchy. Caches are employed in data processing systems to provide faster access to frequently used data over access times associated with system memory, thereby improving overall performance. Caches at any level in the storage hierarchy may be private (reserved for a local processor) or shared (accessible to multiple processors), although typically caches at levels closer to the processors are private. Level one (L1) caches, those logically closest to the processor, are typically implemented as an integral part of the processor and may be bifurcated into separate data and instruction caches. Lower level caches are generally implemented as separate devices, although a level two (L2) may be formed within the same silicon die as a processor.

When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Logically in line caches within a multilevel cache hierarchy are generally utilized to stage data to and from caches in higher levels of the storage hierarchy. As data is staged or transferred from system memory or caches in lower levels of the storage hierarchy to a cache in a higher level of the storage hierarchy, a replacement policy—typically a least-recently-used replacement policy—is employed to determine which cache locations should be utilized to store the new data. This process, often referred to as "updating" the cache, causes any modified data associated with the cache location selected by the replacement policy (also called a "victim") to be written back to lower levels of the storage hierarchy. The process of writing modified data from a victim to system memory or a lower cache level is called a cast out or eviction.

Accessing system memory generally has a significantly longer latency than that associated with accessing any cache in the storage hierarchy. For example, accessing system memory may require up to four times as many processor cycles as are required to access a level three (L3) cache, and up to 10–15 times as many processor cycles as are required to access an L2 cache. Therefore, data evicted from a cache in any cache hierarchy level other than the lowest is conventionally written to the next lower level of the cache hierarchy rather than to system memory. For example, data cast out of an L2 cache is typically written to an L3 cache via a private bus between the L2 and L3 caches rather than writing the data all the way to system memory. Although latency for a particular operation is minimized in this fashion, such evictions have the effect of keeping the modified data within a localized portion of the storage hierarchy not generally accessible to other devices in a multiprocessor system.

In systems where data is evicted from an L2 cache to an L3 cache via a private bus connecting the two caches, error correction code (ECC) checking is required on the L3 directory and cache to insure that data integrity is preserved. This increases the number of bits required for the bus connecting the two caches. For example, if a 64 bit data bus is employed for transferring data between an L2 and L3 cache, an additional 8 bits may be required for ECC checking, resulting in a 72 bit bus. This larger bus consumes additional area within the silicon and may need to be operated at a lower frequency than the 64 bit bus.

It would be desirable, therefore, to be capable of evicting data from one cache level to a lower level cache without the requirement of a private bus between the two caches, or for ECC checking of data transfers between the two caches. It would further be advantageous to provide a mechanism for such data evictions which allowed the evictions to be visible to the snoop logic of other devices in a multiprocessor system.

SUMMARY OF THE INVENTION

It is therefore one object of the present invention to an improved method and apparatus for eviction of data from caches in a data processing system.

It is another object of the present invention to an improved method and apparatus for eviction of data from a cache in data processing system having a multilevel cache hierarchy.

It is yet another object of the present invention to an improved method and apparatus for eviction of data from one cache to a logically in line cache within a data processing system having a multilevel cache hierarchy.

The foregoing objects are achieved as is now described. In evicting data from a first cache in a level other than the lowest in a multilevel cache hierarchy, data is written to the system bus and snooped back into a second cache on a lower level in the cache hierarchy. The need for a private data path between the two caches is thus eliminated, and the second cache memory need not be dual-ported. The reload path employed for updating the second cache is reused to snoop cast-outs off the system bus. As a result of the first cache evicting data via the system bus, the second cache never contains data which is modified (M) with respect to system memory and other devices in a multiprocessor system get updated earlier. The need for error correction code (ECC) checking is eliminated, together with the associated additional bits, and may be replaced by simple parity checking. The bus into the second cache thus requires fewer bits, consumes less area, and may be operated at a higher frequency. When employed in conjunction with an H-MESI cache coherency protocol, horizontal devices go from the hovering (H) state to the shared (S) state faster.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
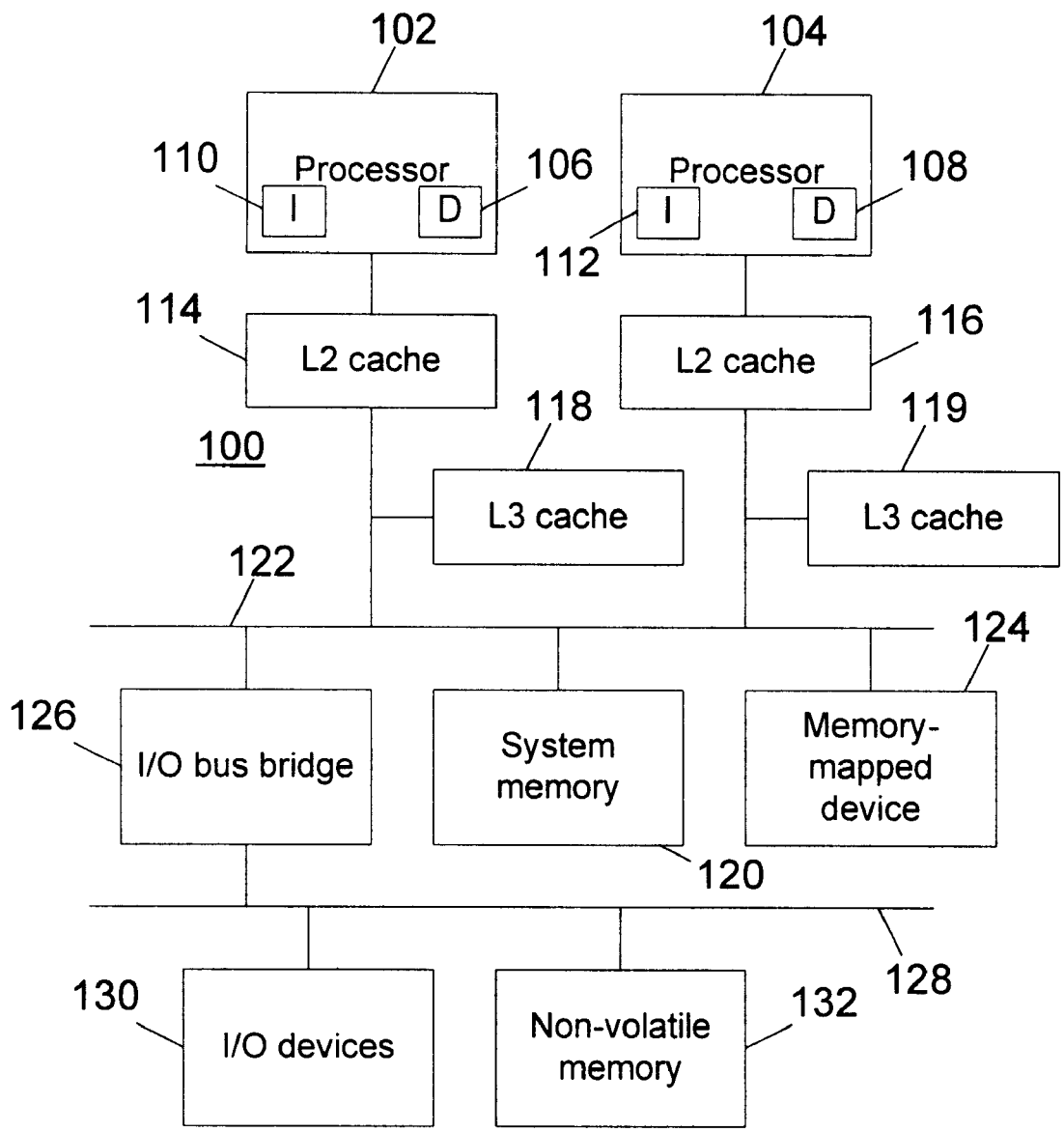
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102 and 104, which preferably comprise one of the PowerPC™ family of processors available from International Business Machines of Armonk, N.Y. Although only two processors are depicted in the exemplary embodiment, those skilled in the art will appreciate that additional processors may be utilized in a multiprocessor data processing system in accordance with the present invention.

Each processor 102 and 104 includes a level one (L1) data cache 106 and 108, respectively, and an L1 instruction cache 110 and 112, respectively. Although illustrated as bifurcated instruction and data caches in the exemplary embodiment, those skilled in the art will recognize that a single, unified L1 cache may be implemented. In order to minimize data access latency, one or more additional levels of cache memory may be implemented within data processing system 100, such as level two (L2) caches 114 and 116 and level three (L3) caches 118 and 119. The lower cache levels—L2 and L3—are employed to stage data to the L1 caches and typically have progressively larger storage capacities but longer access latencies. For example, data caches 106 and 108 and instruction caches 110 and 112 may each have a storage capacity of 32KB and an access latency of approximately 1–2 processor cycles. L2 caches 114 and 116 might have a storage capacity of 512KB but an access latency of 5 processor cycles, while L3 caches 118 and 119 may have a storage capacity of 4MB but an access latency of greater than 15 processor cycles. L2 caches 114 and 116 and L3 caches 118 and 119 thus serve as intermediate storage between processors 102 and 104 and system memory 120, which typically has a much larger storage capacity but may have an access latency of greater than 50 processor cycles.

Both the number of levels in the cache hierarchy and the cache hierarchy configuration employed in data processing system 100 may vary. L2 caches 114 and 116 in the example shown are dedicated caches connected between their respective processors 102 and 104 and system memory 120 (via system bus 122). L3 caches 118 and 119 are depicted as lookaside caches logically vertical with L2 caches 114 and 116. As a result, data or instructions may be looked up one of L2 caches 114 or 116 and one of L3 caches 118 and 119 simultaneously, although the data or instructions will only be retrieved from L3 cache 118 or 119 if the respective L2 cache 114 or 116 misses while L3 cache 118 or 119 hits. Those skilled in the art will recognize that various permutations of levels and configurations depicted may be implemented.

L2 caches 114 and 116 and L3 caches 118 and 119 are connected to system memory 120 via system bus 122. Also connected to system bus 122 may be a memory mapped device 124, such as a graphics adapter providing a connection for a display (not shown), and input/output (I/O) bus bridge 126. I/O bus bridge 126 couples system bus 122 to I/O bus 128, which may provide connections for I/O devices 130 and nonvolatile memory 132. System bus 122, I/O bus bridge 126, and I/O bus 128 thus form an interconnect coupling the attached devices, for which alternative implementations are known in the art. I/O devices 130 comprise conventional peripheral devices including a keyboard, a graphical pointing device such as a mouse or trackball, a display, and a printer, which are interfaced to I/O bus 128 via conventional adapters. Non-volatile memory 132 may comprise a hard disk drive and stores an operating system and other software controlling operation of system 100, which are loaded into volatile system memory 120 in response to system 100 being powered on. Those skilled in the art will recognize that data processing system 100 may include many additional components not shown in FIG. 1, such as serial and parallel ports, connections to networks or attached devices, a memory controller regulating access to system memory 120, etc. Such modifications and variations are within the spirit and scope of the present invention.

A typical communications transaction on system bus 122 includes a source tag indicating a source of the transaction, a destination tag specifying the intended recipient of the transaction, an address and/or data. Each device connected to system bus 122 preferably snoops all communication transactions on system bus 122, intervening in communications transactions intended for other recipients when necessary and reproducing changes to system memory data duplicated within the device when feasible and appropriate.

Figure 2:
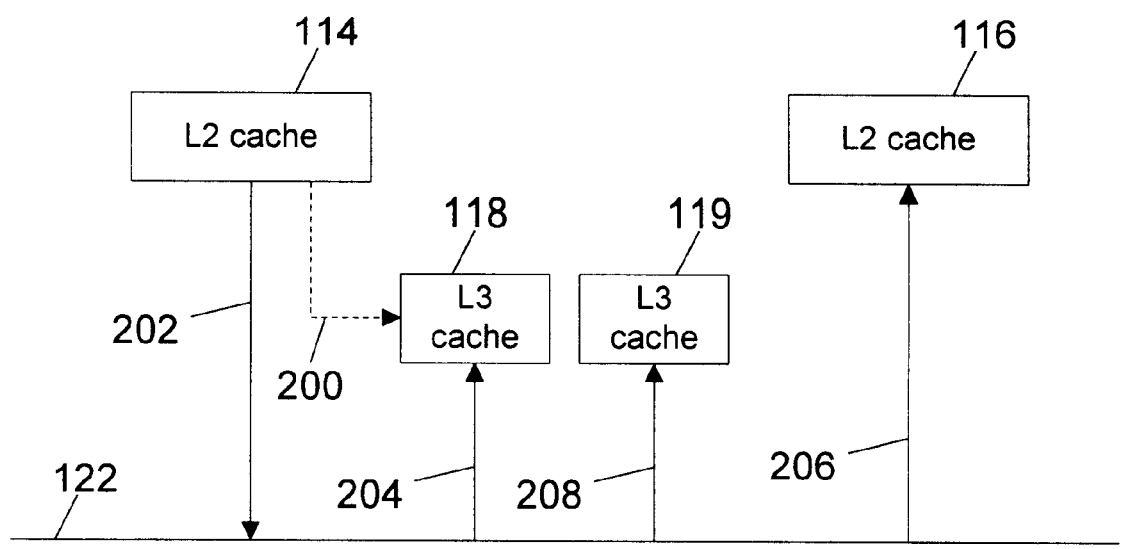
FIG. 2 is a logical block diagram of a cache entry eviction mechanism in accordance with a preferred embodiment of the present invention.

Referring to FIG. 2, a logical block diagram of a cache entry eviction mechanism in accordance with a preferred embodiment of the-present invention is illustrated. The mechanism depicted for the purposes of explaining the invention is illustrated in the context of L2 caches 114 and 116, L3 caches 118 and 119 associated respectively with L2 caches 114 and 116, and system bus 122 of FIG. 1. However, the present invention may be implemented in conjunction with other caches within a multilevel cache hierarchy, such as L1 data caches 106 and 108 and/or L1 instruction caches 110 and 112. The present invention does not employ a private bus 200 between, for example, L2 cache 114 and L3 cache 118 utilized to stage data into L2 cache 114. In the present invention, data evicted from L2 cache 114 is written to system memory 120 via the normal data path 202 to system bus 122. The evicted data is then snooped from system bus 122 via snoop logic path 204 to L3 cache 118. The evicted data may also be snooped from system bus 122 via snoop logic path 206 to L2 cache 116 and via snoop logic path 208 to L3 cache 119 utilized to stage data into L2 cache 116. This mechanism for evicting data from an L2 cache may also be implemented in conjunction with a merged vertical cache controller mechanism described in the related application identified above.

By writing evicted data from L2 cache 114 to system bus 122 and snooping the data back into L3 cache 118, the need for a private or "backdoor" data path 200 between L2 cache 114 and L3 cache 118 is eliminated. L2 cache 114 only has one data path, that connecting L2 cache 114 to system bus 122. The reload path 204 for updating L3 cache 118 is reused for snooping cast-outs from L2 cache 114. Thus, the cache memory for L3 cache 118 need not be dual-ported. ECC checking is not required on the directory or cache for L3 cache 118, eliminating the need for multiple ECC bits associated with the data path into L3 cache 118. These ECC bits may be replaced with a single parity bit for all bits in the data path to L3 cache 118, making the bus into L3 cache 118 smaller, consuming less silicon area and capable of operating at a higher frequency. A parity error in snooping the evicted data from system bus 122 may be treated as a miss, with L3 cache 118 subsequently retrieving the data from system memory 120.

Since all cast-outs from L2 cache 114 are written to system bus 122, the evicted data makes it to system memory 120 and to the memory controller. Evicting data via system bus 122 also allows other, horizontal bus devices, such as L2 cache 116 and associated L3 cache 119, to get updated earlier than under prior art schemes for cache data eviction. Horizontal devices, which are connected to L2 cache 114 only via the system bus and may be situated at any level in the cache hierarchy, may snoop the evicted data from system bus 122, becoming coherent with system memory 120 at the same time as L3 cache 118 utilized to stage data into and out of L2 cache 114.

As a result of L2 cache 114 evicting data via system bus 122, L3 cache 118 never contains data which is modified (M) with respect to system memory 120 under the MESI cache coherency protocol. The eviction of data from L2 cache 114 to system bus 122 to be snooped into L3 cache 118 and other horizontal devices achieves additional benefits in a system implementing the H-MESI cache coherency protocol. As described in detail in U.S. patent application Ser. No. 09/024,610, which is incorporated in its entirety herein by reference, the hovering (H) state of the H-MESI cache coherency protocol indicates that an address tag stored in the tag field of a cache entry is valid but that the associated data item (e.g. cache line or cache sector) is invalid. Since data is evicted to the system bus where it may be snooped, a cache entry which is in the H state may be updated and go to the shared (S) state faster. Thus data gets retrieved by horizontal devices based on demand and ages much less within such horizontal devices.

Figure 3:
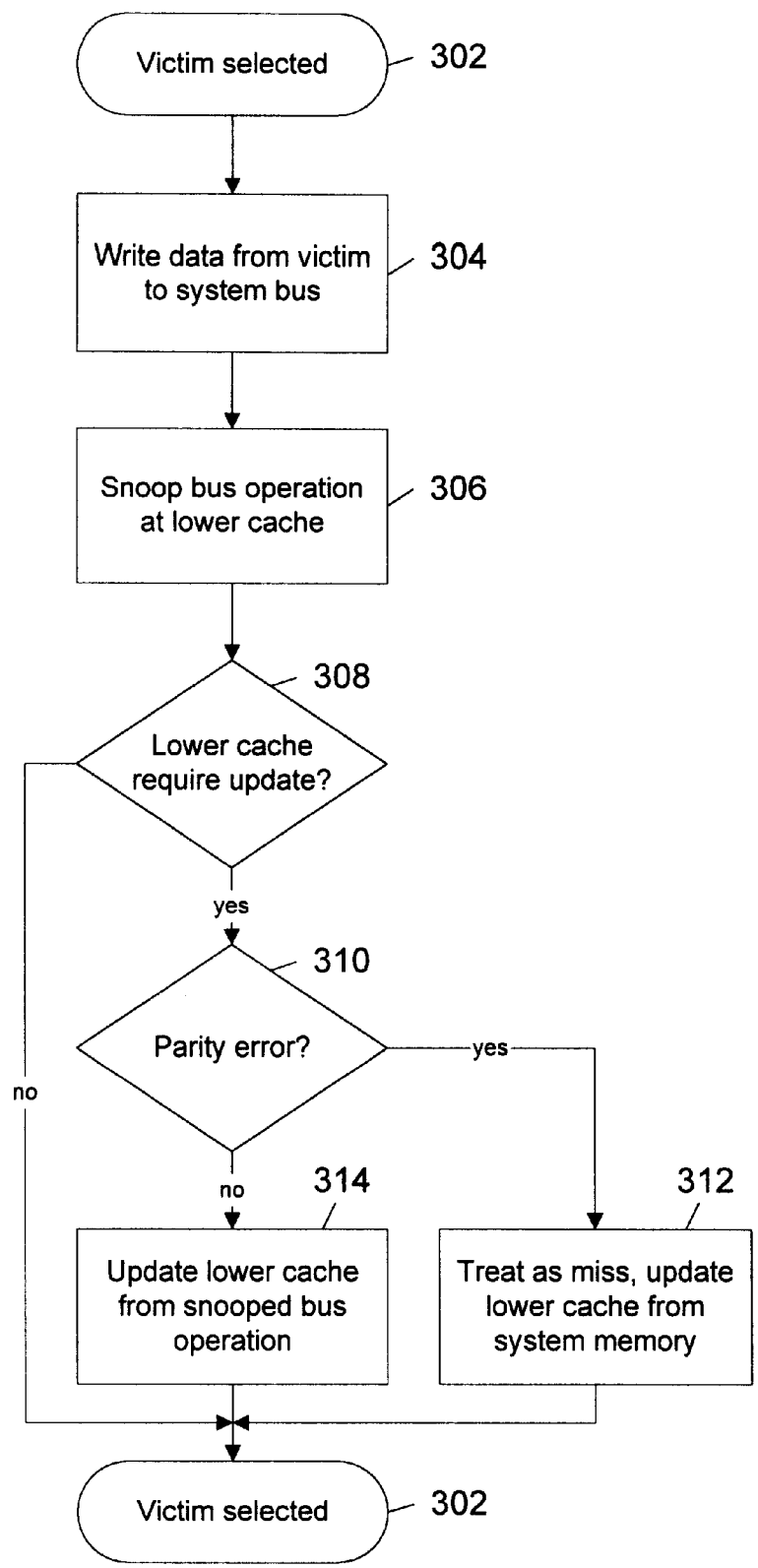
FIG. 3 depicts a high level flowchart for a process of casting out data from a cache within an upper level of a multilevel cache hierarchy in accordance with a preferred embodiment of the present invention.

With reference now to FIG. 3, a high level flowchart for a process of casting out data from a cache within an upper level of a multilevel cache hierarchy in accordance with a preferred embodiment of the present invention is depicted. The process may be implemented within a data processing system including a multilevel cache hierarchy such as that depicted in FIGS. 1 and 2. The process begins at step 302, which depicts a victim being selected according to the applicable cache replacement policy within a cache in a level of the cache hierarchy other than the lowest. The process next passes to step 304, which illustrates writing data from the selected victim to the system bus, and then to step 306, which depicts snooping the bus operation writing data from the selected victim at a cache in a lower level of the cache hierarchy.

The process next passes to step 308, which illustrates a determination of whether the cache entry corresponding to the evicted data requires updating within the lower cache. If not, the process simply proceeds to step 316, which depicts the process becoming idle until the next cache eviction. If the lower cache requires an update, however, the process proceeds instead to step 310, which illustrates a determination of whether a parity error occurred in snooping the cache eviction from the system bus. If so, the process proceeds to step 312, which depicts treating the snoop operation as a miss and updating the lower cache from system memory. If no parity error is detected, however, the process proceeds instead to step 314, which illustrates updating the lower cache from the snooped bus operation, and then to step 316, which depicts the process becoming idle until the next eviction.

Although incurring the longer latency of a system bus operation, data evicted from an L2 cache is written to the system bus and snooped back into the L3 cache. This eliminates the necessity for a private or "backdoor" data bus between the L2 and L3 caches. Only a single data path from the L2 cache, that connected to the system bus, is required, and the L3 cache need not be dual-ported. The reload path employed for updating the L3 cache is reused to snoop cast-outs from the L2 cache off the system bus. ECC checking at the L3 directory and cache, and the associated overhead, is also unnecessary. Data integrity may be verified by simple parity checking, incurring a single bit of overhead, with parity errors treated as a snoop miss and the L3 cache updated from system memory.

Because data from an L2 victim is cast-out by writing it to the system bus, the L3 cache is always coherent with system memory and never contains data which is modified with respect to system memory. Other devices in a multi-processor system get updated earlier by snooping the cast-out from the system bus. When the H-MESI cache coherency protocol is utilized, horizontal devices go from the hovering state to the shared state more quickly.

While the invention has been particularly shown and described with reference to a preferred embodiment, it will be understood by those skilled in the art that various changes in form and detail may be made therein without departing from the spirit and scope of the invention.

What is claimed is:

1. A method of deallocating a cache location in a data processing system including first and second logically in line caches connected to a system memory by a system bus, wherein the second cache is logically below the first cache, comprising:
   selecting a victim cache line within the first cache;
   writing the selected victim cache line to the system memory utilizing a system bus operation;
   snooping the system bus operation in snoop logic for the second cache;
   identifying a corresponding cache line within the second cache which corresponds to the selected victim cache line;
   determining whether the corresponding cache line within the second cache matches the selected victim cache line;
   responsive to determining that the corresponding cache line within the second cache does not match the selected victim cache line, checking data for the selected victim cache line snooped from the system bus operation for a parity error; and
   responsive to not detecting a parity error in the snooped system bus operation, updating the corresponding cache line within the second cache with data from the snooped system bus operation.

2. The method of claim 1, wherein the step of determining whether the corresponding cache line within the second cache matches the selected victim cache line further comprises:
   checking a coherency state associated with the corresponding cache line within the second cache.

3. The method of claim 1, further comprising:

responsive to determining that the corresponding cache line within the second cache does not match the selected victim cache line, updating the corresponding cache line in the second cache with data from the snooped system bus operation.

4. The method of claim 1, further comprising:

responsive to detecting a parity error in the snooped system bus operation, treating the snooped system bus operation as a miss.

5. The method of claim 1, further comprising:

responsive to detecting a parity error in the snooped system bus operation, queueing an operation for retrieving data for the corresponding cache line within the second cache from system memory.

6. A portion of a data processing system storage hierarchy, comprising;

an upper cache within the storage hierarchy;

a lower cache logically in line between the upper cache and other portions of the storage hierarchy below the upper cache;

a bus connected to the upper and lower caches and connecting the upper and lower caches to other portions of the storage hierarchy;

first logic within the upper cache writing a selected victim cache line from the upper cache to the bus upon deallocation of the selected victim cache line within the upper cache;

first logic within the lower cache snooping the data item from the bus and identifying a corresponding cache line within the lower cache which corresponds to the selected victim cache line;

second logic within the lower cache which determines whether the corresponding cache line within the lower cache matches the selected victim cache line;

third logic within the lower cache checking a parity of data for the selected victim cache line snooped from the bus within the lower cache; and fourth logic within the lower cache updating the corresponding cache line within the lower cache if the parity of the data for the selected victim cache line snooped from the bus is correct.

7. The apparatus of claim 6, wherein the second logic within the lower cache further comprises:

logic checking a coherency state of the corresponding cache line within the lower cache.

8. The apparatus of claim 7, further comprising:

fourth logic within the lower cache queueing an operation to update the corresponding cache line within the lower cache from other portions of the storage hierarchy if the parity of the data for the selected victim cache line snooped from the bus is wrong.

9. The apparatus of claim 6, wherein the first logic within the lower cache writes data within the selected victim cache line from the upper cache to the bus upon deallocation of the selected victim cache line only if the data within the selected victim cache line is modified.

10. A data processing system, comprising:

a system memory;

a system bus connected to the system memory;

a first cache connected to the system bus;

a second cache logically in line with and logically below the first cache within the data processing system;

first logic writing data from a deallocated cache location a within the first cache to the system memory via a system bus operation on the system bus;

second logic snooping the system bus operation from the system bus to determine if a corresponding cache location within the second cache matches the deallocated cache location within the first cache; and third logic checking a parity of data for the deallocated cache location snooped from the system bus, wherein the second logic updates the corresponding cache location within the second cache with data for the deallocated cache location snooped from the system bus if the parity is correct, and queues an operation to update the corresponding cache location within the second cache from the system memory if the parity is incorrect.

11. The data processing system of claim 10, wherein the first cache comprises a level two cache.

12. The data processing system of claim 10, wherein the second cache comprises a level three cache.

13. The data processing system of claim 10, wherein the first cache comprises a level one cache and the second cache comprises a level two cache.

14. The data processing system of claim 10, wherein the second logic further comprises:

logic checking a coherency state of the corresponding cache location within the second cache.

* * * * *